March 7, 1967  N. P. HARSHBERGER  3,307,989
ROOFING PRODUCT AND METHOD OF APPLICATION
Filed June 15, 1964  3 Sheets-Sheet 1

Inventor
NORMAN P. HARSHBERGER
By Bailey, Stephens & Huettig
Attorneys

March 7, 1967 N. P. HARSHBERGER 3,307,989
ROOFING PRODUCT AND METHOD OF APPLICATION
Filed June 15, 1964 3 Sheets-Sheet 2

Inventor
NORMAN P. HARSHBERGER
By Bailey, Stephens & Huettig
Attorneys

United States Patent Office 3,307,989
Patented Mar. 7, 1967

3,307,989
ROOFING PRODUCT AND METHOD OF
APPLICATION
Norman P. Harshberger, 1446 Las Lunas St.,
Pasadena, Calif. 91106
Filed June 15, 1964, Ser. No. 375,179
33 Claims. (Cl. 156—71)

The present invention is a continuation in part of my co-pending case Serial Number 351,949 filed April 29, 1953, now U.S. Patent No. 3,137,100, and Serial No. 000,459 filed November 30, 1959, now U.S. Patent No. 3,137,614, and relates to forming roofing slabs or sheets comprising cement, fiber and filler materials. More particularly, the present invention is to a method and machine to produce sheet material and have a product, in some cases and stages, still in an unset state, subject to flexing, indentation, rolling, compression, and then cured into set and hardened sheets to provide improved structural end products laminated and waterproofed under pressure.

As those skilled in the art know, cement asbestos shingles devoid of perlite have certain disadvantages in their set and hardened state when applied to a surface. The set product of the prior art is difficult to cut, nail, or otherwise handle due to the brittle nature of the set and cured product. The set and cured product must be cut, punched, before being secured and nailed. Special tools are required, and the equipment for cutting and punching holes must be done at great disadvantage (away from the spot where they are applied).

Moreover, the prepunched nail holes of a brittle product, is frequently the cause of leakage, since the nail does not have a snug fit, and cannot have, since in nailing it would shatter or otherwise fracture, being hard and brittle. In fact, the conventional precured, and hardened product has little or no impact strength as compared with my new product so far as it concerns its use in place on a building. The old product known as a "cement asbestos product" has few such advantages as in the form fit features brought about by my new method and product.

It is an object of the present invention to provide a cement slab or sheet having a fair degree of tensile strength and retaining cohesion in its wet unset state, so as to bond to the adjoining surface in overlapping and/or abutting relationship, on a surface.

It is an object of the present invention to retain flexibility in the formed product, and for a period sufficiently long, so as to permit the unset cement product to substantially conform to the contour of the surfaces to which it is applied.

It is a further object of this invention to provide ample support to the product in its unset state prior to, and during application to surfaces, where final set and support is provided.

Another object is in providing a suitable carrier means for handling the unset fibrous cement product so it may be advantageous to the applicator to lay the product without fracture, one upon another in overlap or abutting fashion on a roof surface.

Another object is in providing a carrier means for handling the unset fibrous cement product, and of a nature which may allow air, gases or other fluids to be withdrawn or pressed through the carrier means while serving as a support for the unset fibrous cement product.

Another object is in providing a carrier means for roofing slabs and sheets which will provide substantial flexing of the formed unset cement product, while still substantially preventing dislocation of the lay of the fibrous binder, and fracture of the unset product, while aplying the product to a surface.

Another object is in the ready removal of the carrier at any point, in the steps of making, laying and curing of the unset, unhardened, cement fibrous product when so desired.

A further object is to provide a form fitting unset flexible slab or sheet that becomes set and hard, following placement on a surface, and providing thereby a weatherable protective covering.

Many shingles of the prior art when weathered become curled, warped or otherwise distorted. Asbestos cement shingles are frequently susceptible to curling unless surface nailed at the butt portion.

Stresses are set up in high density shingles of the prior art upon becoming cured and dried, forming at the surfaces an extremely dense crust like concentration of cement. The rate at which a product losses moisture, or conversely takes moisture in, has a bearing on the degree of distortion when later applied to roofs.

In forming my sheet product, I have discovered that I can substantially prevent distortion brought about by methods of the prior art. By incorporating a large volume of low density filler material with the other ingredients, provides a mixed slurry several times greater in mass, both before, and after dewatering, than is the case with sheets made of only cement and asbestos. My preferred product contemplates the use of a large volume of filler, so when consolidated by application of pressure, the product will have a uniform distribution of components and still be of lower density than sheets of the prior art. It seems that the filler material also provides a cushioning result when subjecting the felted mass of relatively wet materials to pressure. I have observed that the cement content is more uniformly distributed throughout the product, substantially eliminating the tendency to distort. The density of my product, dried to constant weight, may be as low as twenty pounds to the cubic foot.

By virtue of laying my sheet product in an unset plastic state, along with the use of these fillers, I substantially prevent distortion of the sort found in shingles of the prior art.

It appears that the rate at which my product loses moisture, while installed on the roof, and takes form with cement to cement bond, is one of the reasons for its stability in place, after set and cure.

There are other indications that prevention of substantial distortion of my product may be attained by applying colored latex films over the surface of the sheets after the sheets are laid on the roof. Such treatment prevents to a substantial degree, the rapid loss of the water of hydration, from the cement and consequent dusting.

Migration to the surface of the sheet of solubles that form upon contact with the carbon dioxide of the air, an insoluble white deposit, is substantially eliminated by application of silicone water repellant in a proportion of five parts resin to 95 parts mineral spirits. For some reason, this treatment also seems to retard distortion of my product. It seems that perlite is wetted readily with silicone applications and may well be the reason why such great penetration is attained in my product as compared to ordinary concrete.

Water alone, does not readily wet most forms of volcanic ash. The addition of wetting agents in forming my product, brings about most satisfactory results.

In references to cement to cement bond throughout my present invention, I am not referring in any sense to thermoplastic cement, asphalt coatings, by which asphalt shingles sometimes become bonded by extreme heat in weathering on a roof.

When I attain cement to cement bond, I refer to a hydraulic cement, or where in setting of a hydraulic cement in place on a roof it becomes bonded to a suitable coating of a water dispersed, or emulsified coating that is film forming.

A still further object is to provide a cement slab or sheet for roofing and siding, wherein the unset product may be fastened by suitable means to the surface to which applied, and having cement to cement contact to seal the lap joints and the fastening means at desired points in order to secure one to the other and to prevent leakage in said areas.

Other objects and advantages of my invention will become apparent from the following description.

This product may be made by board forming machines such as described in my co-pending case, Serial No. 188,168 filed September 30, 1950, now Patent No. 2,722,868, and utilizes the types of fabric, metal or reticulated sheets therein described as support or reinforcement for my roofing.

In general the present invention is directed to a means by which roofing and the like may be manufactured at or near the location of the place where the end product is to be applied. This system of application does not lend itself so well to practical use, where the period of storage, and shipping time, exceeds the normal setting periods for hydraulic cements, for example, cements such as Portland or similar products.

I have found, however, that by use of portable wet forming dewatering equipment, I can make at a practical rate of production, a felted cementitious sheet product, and get the product into place on a roof with the greatest advantage. Gravel and sand concrete when once placed must so remain until set. After setting only, may the forms be removed. My method does not apply to poured concrete of merely sand and cement, as fractures would occur in handling.

My sheet roofing product requires no such forms as employed for conventional concrete and may be transported outside of any container before becoming set or hard.

I have found by the use of about 5 to 20% by weight of chrysotile asbestos fibre of a nominal fibre length, together with from 80 to 95% by weight of cement, that I may by vacuum dewatering, then form, and carry on a reticulated carrier plate, one or more, large slabs of roofing material to the point of application on a roof deck, laying the product in place without fracture of the material.

My usual procedure is to progressively make my product by first depositing in a large volume of water, from 5 to 20% by weight of fibre (the quantity depends somewhat on the character of the fibre). I then add thereto, after the fibre has been dispersed in the water, from 5 to 35% by weight of filler material weighing from 5 to 30 pounds to the cubic foot (loose fill). The hydraulic cement is then added in an amount of about 70 to 95 parts by weight. This mixture is kept in constant agitation until all of the components are wetted, at which time it is dewatered through a screen, there forming a relatively soft cake of desired thickness. Pressure may or may not be applied to further consolidate and densify the mass, or provide designs on the sheet or shingle material. Examples of the formulas that have been successfully used in making my product by the present invention are:

|  | (1) | (2) | (3) | (4) | (5) |
|---|---|---|---|---|---|
| Fibre | 15% | 5% | 5% | 15% | 5% |
| Filler | 30% | 35% | 30% | 5% |  |
| Cement | 55% | 60% | 65% | 80% | 95% |
|  | 100% | 100% | 100% | 100% | 100% |

Figure 1:
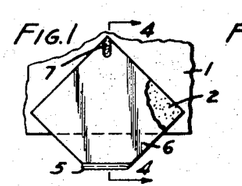
FIG. 1 is a plan view of the shingle with the carrier plate on top of the unset shingle after placement on roof surface.
Figure 2:
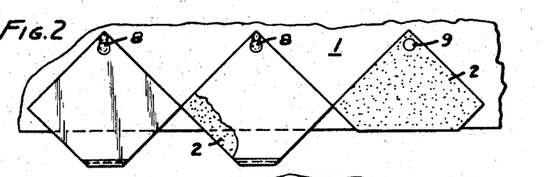
FIG. 2 is a plan view showing one of the carrier plates removed and the fastening means driven into the unset soft cement fibrous shingle.
Figures 3, 4, 5, 6, 7, 12:
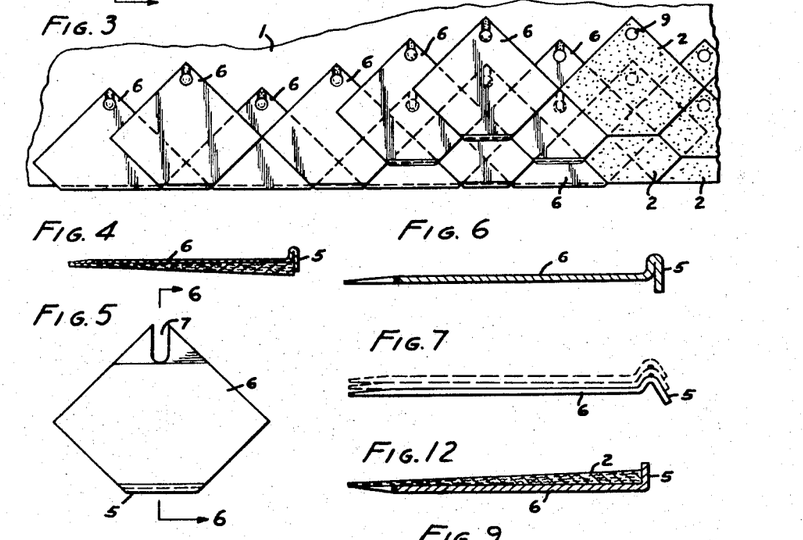
FIG. 3 is an assembly of the shingles with the overlap of the shingles shown.
FIG. 4 is a cross sectioned view showing the carrier plate in position on top of the unset shingle as it would lay on the roof along line 4—4 of FIG. 1.
FIG. 5 is a plan view 6—6 showing extreme cross section of FIG. 6.
FIG. 6 is similar to FIG. 7 except for lip formed at its edge wherein FIG. 6 will not nest in stacking like FIG. 7.
FIG. 7 has relief taper like FIG. 6 to permit ready removal from under nail heads and shows how the carrier plate may nest for reuse.
FIG. 12 shows a carrier plate in supporting position of the unset cement shingle ready for application by the roofer.

After the product has been formed and deposited on the carrier means, for example, a wire screen or plate, the product is carried to the roof, lined up with the lower edge of the roof line, then flipped over leaving the carrier means on top of the unset shingle product, like shown in FIGS. 1, 2, 3. This is one of the methods employed where it is desirable to utilize the carrier as a temporary protective means during the initial cure of the form fitting unset roofing sheet.

For convenience the term "sheet" will be used in the sense of defining any form of shingle or rolled roofing.

It is to be understood that the term "carrier" shall define a support for handling and placement of the sheet material, whether it be a temporary or a permanent attachment of the unset sheet. Moreover, it is to be understood that the carriers may be positioned and left under the unset sheet material, either as a temporary or permanent fixture. The carrier may be made of fabric, metal foil, or any reticulated material, such as described in my Patent 2,722,868 (March 24, 1964).

In the case of using the carrier underneath the unset sheet, removal may be accomplished by either pulling from beneath the sheet, said carrier or in the case of rolled sheet, lifted off, if desired, after the sheet has been secured and before it has become set and hard.

When it is found desirable to remove the unset sheet as a shingle of relatively small size, I have found that it may be to advantage to best place the unset product in place, by holding the carrier in a fixed position, then sliding the shingle off in registration of the other component parts of the roof.

In accomplishing the greatest ease in removal of the sheet from a carrier, a fine screen cloth or smooth metal sheet as shown in FIGS. 1 to 10 is preferred.

In rolled roofing, either a screen, cloth, or metal carrier may be employed, all depending on whether or not it is desired to form and dewater the product, on or off of the carrier. Such carriers may be used for transporting the sheet product in manufacture, application, or end use.

In actual practice I have discovered that in applying my sheet material over old gravel and mineral surfaced roofs, that fasteners for my sheet covering are not always necessary. That is because of the fact that the unset, relatively soft, fibrous sheet forms around and adheres to a substantial degree, to the rough surface of the old roof covering even though substantially dewatered.

Moreover I have found in old roof coverings that protruding nails, which have worked up above the surface of the old coverings, are an advantage in further holding in place the massive slabs of unset fibrous sheet material. Such advantages reside only in substantially thick sheet coverings of the order of one half to one inch or more. It may be seen that the following set, of the unset cement sheets after application, that the fasteners in the roof surface below, may not further work out of place. In cases it is of course, desirable to have the fasteners driven back in. After hardened, my product does not readily puncture. Such a result is a distinct advantage over older roofing products that puncture or crack as a result of rough surfaces to which applied.

A very important advantage in form fitting my fibrous cement unset sheet over uneven old worn roof coverings, is in the fire protection then afforded to the under covering since substantially close fitting the lower surface. In most cases the old roof has become dried out and susceptible to shedding of the gravel or granules, and my product prevents further loss becoming bonded thereto.

This invention is directed to the protection of old worn sand or gravel surfaced roofs, the prevention of shedding of the surface, thereof by having the fibrous cement components of my new covering hold in place, and insulate against the weather, the components of the roof over which the new product is applied.

I make no claim to poured on concrete as it applies to protecting old or new roof surfaces in set, or unset condition.

I have discovered in laying down preformed unset fibre containing products of the formula as set forth in the examples heretofore provided, that I may weatherseal these joints by laying these sheets, in butt edge relationship. After so placing, I apply by hand, ample pressure so as to actually unite, or otherwise weld together, in interlocked relationship the fibre and cement components of one sheet, to another.

The results attained in the treatment of my product is unique. Sealed unbroken joints in my product prevails because of its density as made, laid, and form fitted, and while in a non-fluid state of application. I have found that my product in its unhardened sheet form, may be advantageously pressed in and around roof fixtures such as vents, corners and ridge contours without severe disturbance of the fibre lay of my sheet material which provides the tensile strength, impact resistance, and other non-flowing characteristics all so important in my approach in having handleability during application to the various surfaces.

Hydraulic cements take their set by combining chemically and the term cements as contemplated in this invention is a cement that is first plastic, and then becomes set and continues to harden by chemical action.

The use of the word "felting" is to describe the interlocking relationship of fibre to fibre matting, in the formation of my sheet material. The felting characteristics of my product contribute materially to the handleability in its application, particularly in application over surfaces while the product is still flexible and relatively soft. In my product it is not of great importance that it be very dense, or in fact, as strong as would be required if it were first set, cured, hard, and brittle before being applied, as in the case of shingles of the prior art. My new method permits of less strength for weight ratio in the product. Because of the use of a carrier to facilitate further, the handleability of low density sheets, I am able to incorporate a large volume of low density filler material for insulation.

I provide a product light enough in weight to handle without substantial fractures as it is made, laid and used.

A carrier is not always required in removing the sheet after felting and dewatering, though when so removed, a large volume of fibre, well felted, is preferred. With such procedure, one may transport it so long as it holds together and carries its own weight for handling, without fracture. While laying such a product in unset and relatively soft state, of course, greater care must be exercised as compared to transporting with a carrier, and so applied to a roof.

Since a low density roof which furnishes insulation is highly desirable, I generally employ for such an objective, a low density volcanic ash, perlite, pumice, or the like, within the limits of the range shown in the examples given above and defined as "filler" material. Such filler is best suited to serve as an aggregate in order to keep the weight of the product low.

With my low density sheet, I find a vapor barrier is usually required to prevent excessive absorption, and in my product, I have found sprayed, rolled or poured coatings of emulsified resins (synthetic or natural), pitch latex or wax are quite as satisfactory, as integral waterproofing. That especially holds true when these former group of substances are applied while in the process of dewatering the product by vacuum equipment. The protective water repellant substance is drawn thereby into the sheet, or onto the surface of the felted sheet to aid the cure and impart color. The use of silicone water repellants in surface finishing of my product has the distinct advantage of preventing to a substantial degree, the migration of soluble salts from certain cements I sometimes employ as a binder.

In FIG. 1, reference character 1 is a roof surface over which has been laid a roofing sheet 2 which in this instance is in shingle form. The sheet is covered by a carrier 6 having a flange or lip 5 designed to protect and hold in place or assist in removal of carrier 6 from said sheet 2. The carrier 6 is for conveying the sheet and to facilitate laying of the sheets. The slot 7 is designed to provide a place through which to nail the sheet 2 when it is desirable to support the whole of the sheet, or cover it. The carrier 6 may be thereby removed with greater ease, at any time. The slot 7 being open at one end permits the removal of the carrier 6 from the shank of the nail shown at 8 in the assembly of the sheets 2. In FIG. 2 it may be seen that at the extreme right, of FIG. 2, the carrier 6 has been removed to expose the sheet in its position, the nail head 9 holding the sheet at registration with the lower edge of the roof 10. The butt edge of the sheet has been cut off at that point while the sheet is soft, then serving as one of the course of sheets employed, like the others and overlapped so as to form in the end, a complete roof covering. In FIGS. 1, 2 and 3 the corners are shown in registration and laid by the so-called French method. No claim is made to the shape of the sheet in the present invention or to the proportions or extent of exposure to that of the covered portion.

FIGS. 1, 2, and 3 clearly show steps taken in application of the sheets 2 laid up in registration, with carriers covering the sheets in certain areas. The carriers are sometimes left in position for convenience in getting about over the roof when the sheets are in a very soft condition and before becoming set and hard. There are instances where the carrier is left on the roof as a permanent surface, in which case the sheet is at times preferably formed into an extremely low density in order to provide the maximum insulation to the roof. The sheets 2 are, as in each instance, applied while in an unset state and relatively flexible. In that condition I have found that I may use metal foil as a carrier to transport, apply and protect the unset sheets, and roof over which they are applied. In the case of the carriers being of thin metal, the carrier form fits into position with the sheet 2 or the sheet 2 conforms to the foil. In this manner any of the carriers 6 may be used on top of the sheets 2 or underneath the sheet 2. When warranted, while considering the type of protection called for, cure of the sheets, weather protection, impact resistance, while the sheet is soft and weather resistant after the sheet becomes hard are important features of the present invention. To combine the laying of rigid or flexible carriers as shown in FIGS. 1, 2, 3, 4, 12 with a dewatered unset sheet, is a distinct advantage over preformed insulation that has been produced at a factory and is first dried, cured, and packaged at that point. With less handling of the unset sheet, and no handling of a cured, hard and brittle product, great savings are at hand.

The modified edge views as shown in FIGS. 5, 6, 7, and 9 seem to require no further comment. FIG. 8 is a plan view of FIG. 10 and has two recesses 7 for receiving nails 9 and a hole 10, with a raised lip to aid in removal of the carrier 6.

Figures 8, 9, 10, 11:
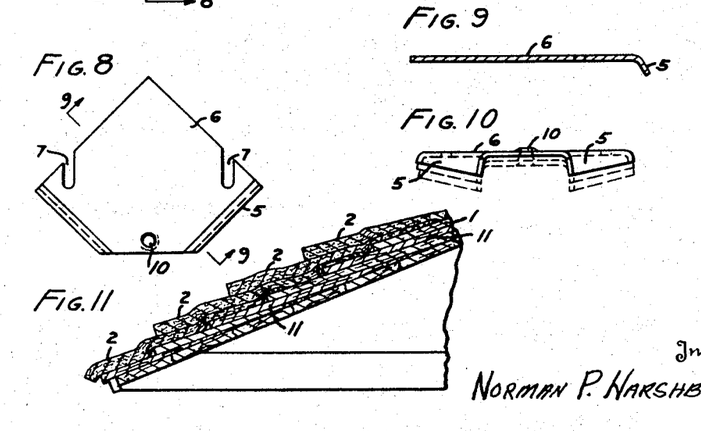
FIG. 8 shows plan view with slots for nailing into unset shingle and hole for withdrawal of carrier plate together with side edge lips along 9—9.
FIG. 9 is modified view where carrier plate has bent down flange for ready release of product.
FIG. 10 shows stacked relationship of FIG. 8.
FIG. 11 shows the unset form fitting shingles laid over wood shingles or similar surfaces.

FIG. 11 shows an assembly of my new sheet product in overlapping relationship over wood shingles clearly showing how the unset, relatively flexible and compressible shingle follows the contour of the roof below and in providing support for the new product in its flexible, limp, and uncured state, before becoming set and cured.

Figure 26:
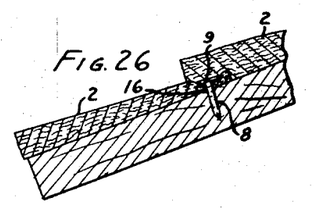
FIG. 26 is a section of an unset fibrous sheet of tapering form blind nailed to depress and secure as desired areas the unset sheet so the overlapping unit may nest therein.

I have not shown the coatings, water repellants, employed to protect the uncured product, nevertheless it is to be understood that protection of the surfaces and the integral body of the sheet, is of importance as it concerns its cure in all kinds of weather. It is to be noted that the fibre to cement, and cement plus fibre mixed with filler and dewatered makes possible the assembled roof over steep as well as flat roofs. The problem of proper cure is solved by the retention of sufficient water after placement on a steep roof. I attain satisfactory cure by incorporating integral waterproofing or surface treatments. The carriers 6 also contribute to the transfer of sealing substances to hold color and protect in general, the surfaces of the unset, uncured faces of the sheets. These sheets 2 must be dewatered to a degree that will avoid excessive drip onto the sheets below, however still wet enough, so as to provide sheet to sheet bond. Such treatments minimize the chance of leaks through narrow lapped joints such as shown in FIG. 26 at nailed location 9 where the nail is covered by a narrow depressed lap joint.

Figure 13:
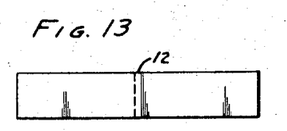
FIG. 13 shows two shingles in end lapped relationship.
Figure 14:
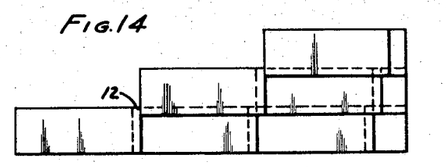
FIG. 14 shows an assembly in the Dutch-lapped fashion of application.
Figure 15:
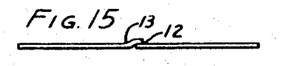
FIG. 15 is an edge view of FIG. 13.
Figure 16:
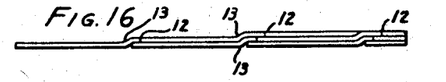
FIG. 16 is an edge view of FIG. 14.
Figure 17:
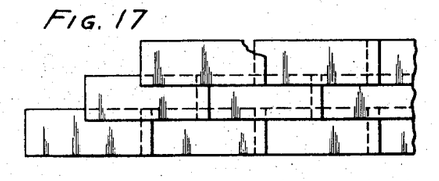
FIG. 17 is a plan view of a modified manner of laying unset cement fibre shingle slabs wherein the product may with sealing features more readily be laid over courses below in their unset state of cure.
Figure 18:
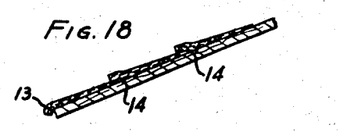
FIG. 18 is a lapped over end view of unset sheets laid over a smooth surface.
Figure 19:
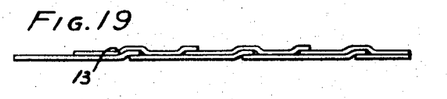
FIG. 19 is an edge view of FIG. 17.
Figures 27, 28:
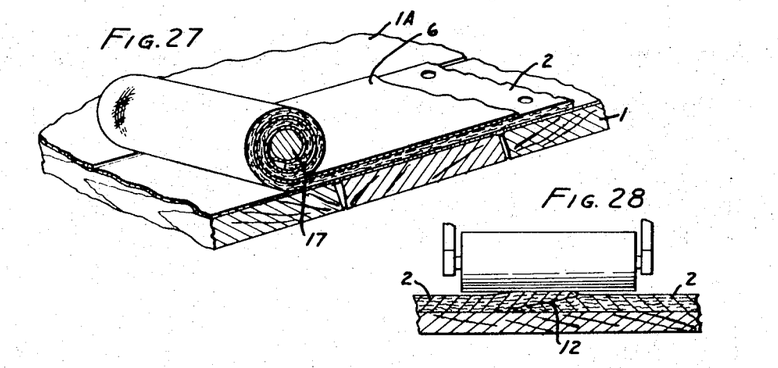
FIG. 27 is a sheet of unset cement and fibre formed on and between a suitable flexible carrier so when unrolled the unset product may be laid over another sheet and board deck and secured thereto.
FIG. 28 shows a roller compressing the unset cement fibre product at lapped joints to cause a bond and protect against leakage from the elements, the surface over which the sheets are applied.

Referring to FIG. 13, you will note that the two sheets are laid with overlapped ends as in the case of FIG. 14, which shows the starting points for three courses of sheets. With the relatively small overlap as shown by the proportions of the covered portion to that of the exposed portion, it will be seen that a sealed lap becomes important to avoid leakage at that point. With shingles and tile that are rigid when laid, narrow laps become a problem due to leakage at that point. With my unset non-rigid shingle, I may, with slight pressure at the narrow laps, bond together these portions of the shingles by setting of the hydraulic cement at those points. In sectional views FIG. 15 and FIG. 16, the importance of a monolithic bond may be seen in order to avoid leakage. Where hand pressure is insufficient to weld, press down, and seal such laps or joints, I may use a roller as shown in FIG. 28 to seal the laps and bring the two sheets substantially into one plane for a smooth surface appearance. When rough irregular surface contours are desired, the sheets are laid as shown in FIG. 17 and clearly seen in the sectional edge view FIG. 19. In FIG. 18 it will be seen how the tapered shingle more closely conforms to the surface over which it is laid, leaving a minimum of air space between the sheet itself and the deck over which it is applied as shown at 14. When it is desired to simulate small shingles while retaining long sheets and narrow laps, the unset relatively soft and fibrous sheet may under application of pressure, have designs made in its face. While so doing, advantages are had by bringing the whole of the shingle in closer relationship to the contours over which it rests. I have found that with fibre content of 5 to 20 percent by weight of the product, that the fibre prevents the sheet from spreading too much and that when compacted as by hammer blows, only becomes more dense and strong following set, and becoming hard.

Figure 20:
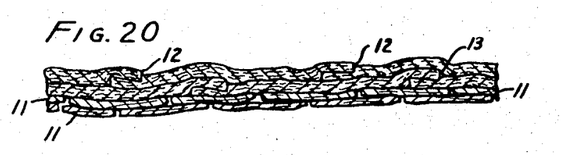
FIG. 20 is a sectional edge view of old wood shingles covered by my unset form fitting cement product in overlapping relationship.
Figure 21:
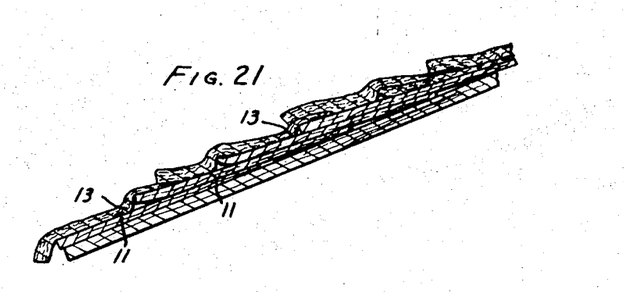
FIG. 21 is an edge view showing how my unset fibrous shingle follows the general contour of the stepped shingle courses over which they have been applied when my unset product is in an extremely soft low density form.

In FIG. 20 it will be seen how depressed, unset, overlapping sheets may be treated while in that degree where they may be indented, formed, and compacted as at 12. With the lap 12 sealed in addition to be depressed below the surface of the adjacent sheet, real weather protection is afforded. FIG. 20 sheet assembly is shown laid over curled wood shingles 11. FIG. 21 is sectional view that shows how a soft low density unset sheet takes form over the shingles 11.

Figure 22:
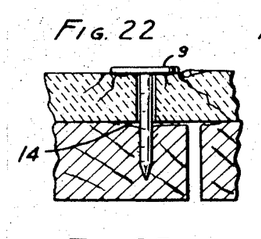
FIG. 22 shows what takes place in set rigid cement shingles when a nail is driven to place in the preformed hole of a hardened cement shingle.

In further reference to FIG. 22 it will be understood the showing is that of a preformed rigid, highly pressed, hardened shingle that has prepunched holes for driving nails into the surface to which applied. Such conventional asbestos cement shingles are seldom applied without undue breakage in shipment and application, and fracture when the nail is driven in with excessive impact. Since there is never a uniform close relationship with the surface below as at air space 14, leaks occur.

Figure 23:
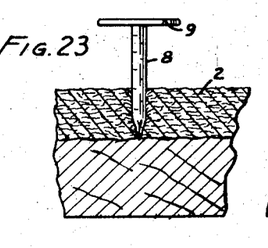
FIG. 23 shows a nail being driven into an unset relatively soft cement fibrous shingle.
Figure 24:
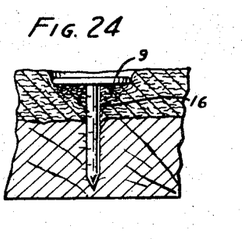
FIG. 24 is a similar view to FIG. 23, with the nail showing driven in having the snug fit, and having compressed the unset cement fibrous roofing.
Figure 25:
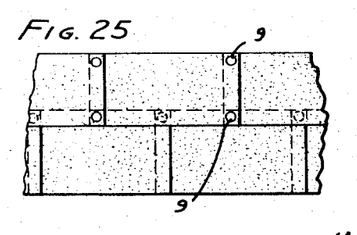
FIG. 25 is a plan view of the roofing laid in overlapped relationship with nails buried below the face of the product.

Again referring to FIG. 23 it is to be noted that the nail 9 is pressed in by hand (the hand not shown) and there held ready for a hammer blow, which sets the nail as shown in FIG. 24. The shank of the nail is intimately surrounded by the sheet material of my product which soon becomes set and hard as it shrinks around and bonds to the nail's shank as at 16 with the nail at least flush or below the surface densifying the material for greater strength at that point. A like condition is shown in FIG. 26 at 16.

FIG. 27 shows an advanced method of laying rolled roofing sheets which are first formed into a web on suitable dewatering equipment and then, preferably dewatered while on the carrier with which it is run up into rolled form. A mandrel core 17 serves to hold the roll in shape while winding the carrier 6 and the sheet 2 onto the core 17. In the illustration in FIG. 27, the uncured, relatively soft sheet is shown wound as an outer layer for certain advantage, unrolling onto the roof in lapped over courses. With perhaps certain disadvantages, the sheet 2 may nevertheless be wound inside of the carrier 6, which must be porous if the carrier is used on which to form the sheet, during the dewatering cycle and while used to transport and lay the sheet upon a roof or like surface. In any other manner of forming the sheet 2, the carrier may be metal, strong flexible board, plastic sheet material or paper. Glass cloth and other reticulated material is sometimes an advantage where it is desired to keep the weight to a minimum for ease in carrying in the rolled form onto the roof. The carrier is washed and reused when desired after removal from the sheets 2.

Figure 29:
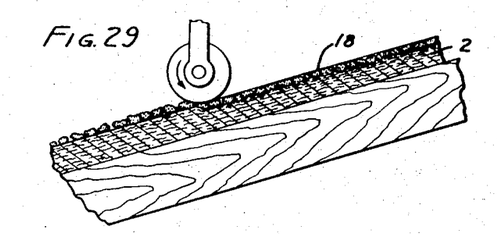
FIG. 29 shows granules being rolled into the unset product after application of the sheet product as laid over a roof deck.

FIG. 29 shows a similar sheet with granules 18 buried for surface wear and color, and with the sheet in place for cure and weathering purposes.

In any one, or all of my proposed sheets, I may use slurries of various density and consistency, and mix together in any chosen sequence, such components in order to attain the best results. Several different slurries may be employed in the forming of my product. In the making of sheet laminates and for purpose of simplification, one of the preferred approaches is set forth in the present invention as follows:

Example: In order to assure maximum water resistance in my product, I first place in a suitable mixer, a large enough volume of water to thoroughly disperse while agitated, from 5 to 20 percent fibre to the weight of cement added. To this slurry, I incorporate sufficient low density filler to provide a slurry of correct density for the particular end product. After a thorough mixing of the slurry, it is depoisted on a filtering surface where the water is partially withdrawn. While in this dewatering and unpressed state, and still on the filtering surface, I deposit thereon another slurry comprised of waterproofing ingredients in dispersed or emulsified form, and again draw off by suitable dewatering means such fluid as is contained in the waterproofing substances. Such a procedure will form the most effective vapor barrier at one or more levels of the formed sheet. Repetition of these steps is contemplated for certain end uses.

In certain cases organic pulp (kraft or waste paper) for example, is employed, and in amounts great enough to have intimate fibre to fibre felting and thereby prevent parting of my monolithic sheet during application of the sheets. In use of such fibre, it is highly desirable to first treat the fibre, organic or inorganic, with a silicone resin, one that has been dispersed in a suitable fluid. I have found both caustic and mineral solvents may be used to disperse silicones, for the impingement of hydrophobic films on the fibres as used in my present product. Such treatment prevents adsorption and absorption (water onto, or into) the fibre. With such use, several advantages are brought about. In mixing the pretreated fibre in water, together with the cement and filler, the water is then better able to properly hydrate the cement and the fibre has little or no effect as the cements set. Moreover the fibre so treated, then has greater freeness. The term "freeness" is used to describe the rate at which pulp components may be dewatered. I have found that silicone pretreatment of the fibre and filler, materially improves the sheet formation, and speeds up the rate of dewatering of the sheet, water repellency, distortion, dimensional stability, in place when becoming dry, or again subject to wetting as the product weathers in place. Sometimes I treat the fibre with silicone dispersions then dry the fibre to set the silicone on the fibre prior to its use in the mixture with other fluids and solids. The term fluids shall be interpreted as solids that may be made fluid, as well as liquids and gases.

With the following formula examples, densities as low as 17 lbs. a cubic foot have been attained when I use hydraulic cement such as Portland, calcium aluminate, natural cements. With such a low density range wherein these cements are employed, and with only slight additional pressure, and a density of the order of 55 to 80 lbs. per cubic foot, I have attained a modulus of rupture as great as 809.84 lbs. With still greater pressure and substantially the same formula (densities of 67 to 78 lbs. per cubic foot), a modulus of rupture of 2,970 lbs. has been attained. At 78 lbs. density, 3,130 lbs. modulus of rupture was reached with the use of 15 percent fiber, 20 percent perlite, and 65% cement. Adjustment of the fiber type, length of fiber, and the physical values thereof, including surface characteristics, are critical factors inasmuch as the bond with the fiber, filler, and cement appears to be materially affected by some of the untreated fibers and fillers. The solubles released by use of some of the fibers during their hydration, and some of the fillers also, have been found to have a retarding effect on some of the cements employed. This phenomena is not fully understood. It is believed to be the complexity of the reaction of the hydraulic cements. At any rate, the strength over weight ratio is affected by these solubles and may in some instances affect the optimum strength characteristics desired. The effect on the cement depends somewhat on how much cement is employed. Increase of cement most generally improves the products that must have low water absorption. Cement in excess of from about 70% to 80% does increase brittleness, and lower impact strength and insulation values. However, I have discovered with a lower cement content, but with increased pressure in the order of from 500 lbs. per square inch to as high as 1,200 lbs. per square inch, that the overall water-proofing values of my product may be greatly improved and the weight lowered, in respect to the strength value, all without excessive brittleness. Surface characteristics at these higher pressures vastly improve the surface design and other desirable characteristics.

During the years devoted to slight but important formula changes in the use of hydraulic cements, sometimes lime, gypsum, all used in making my end products, I have become aware of the importance of selecting the right type of filler and its relationship with the other components in getting optimum bond with the binders. The hydraulic cements, be they of the natural type, or of low lime slow-setting, or the high early strength types, or a combination with those high in aluminate (substantially free of efflorescence after setting), the selection becomes more critical.

In particular, I have discovered that the order in which the components are mixed, the time allowed for mixing to wet out the components to the greatest advantage results in increasing the rate of formation. The reason for this phenomena would appear to be that when adding a cement last to the other components, and mixing rapidly for a very short interval (of the order of 2 to 5 minutes) depending somewhat on the efficiency of the mixer, that the cement particles do not have a chance to become gelatinous and otherwise would somewhat fill the voids with gelatinous material. The rate of dewatering is, of course, a material factor in reducing the cost of producing the product. Along the same objective of increasing the rate of dewatering, I have discovered that the use of suitable fillers providing substantial point to point contact as used with the other components, thoroughly mixed and dewatered, with or without cement, assists in the rapid formation of making my product. When cement is employed as the component, it, of course, increases the density of the end product in pounds per cubic foot, with everything else in the way of components, comparable. The tendency, however, with increased percentages of a specific type of cement, causes the rate of filtration of the whole to slow down. By using substantial quantities of spherular ingredients as fillers with the fiber and particularly cement, I have discovered that a wide range of fibers and filler carefully processed in the mixing operation, makes a great difference in the end product density and weight over strength ratio. Time and again I have found that with the increase of pressure, the dewatered sheet is vastly improved in general appearance when up to about 1,000 pounds p.s.i. is applied. I have applied pressures as low as 30 pounds p.s.i. up to 1500 pounds p.s.i. when cement formed one of the components.

Pressures are less effective in holding the pressed density when hydraulic cements are omitted. Also, the dimensional stability of the product without cement and adequate water-proofing substances becomes unstable dimensionally.

As the filler material is increased, it appears to impart an interesting pattern of flow under high pressure, and with the use of cement as a lubricant and binder, the voids of the formed sheet are more readily closed, and when the cement content has reached about 70% of the total component solids, little or no water-proofing additives become necessary to close the cells for adequate water-proofing.

The smallest closed cell volcanic ash particles, be they of a plate-like form or a semi-spherical, it appears that the voids of the sheet are more readily closed with the application of pressure. Most certainly, the relationship of the feltible fiber as oriented with the hydrous silicates account for the resistance to crushing, and on the average makes a much stronger and denser product.

As indicated in the Patent #2,001,608 to Chester G. Gilbert, the advantage of spherular materials are thoroughly pointed out as they relate to pack, and point to point contact advantages in determination of particle size, frictional resistance, etc.

The use of cement such as described in the Gilbert patent is contemplated in combination with the multicellular volcanic glasses described in my pending patent application. It is contemplated that small amounts of plate-like forms of micashist, vermiculite, wherein high pressures of the order of 100–1,000 pounds p.s.i. are used to consolidate the sheet material, so that they might provide some semblance of flow under pressure, and this has proven to be an advantage when used with certain types of sheets, particularly for container applications.

The following example defines the use of kraft pulp, perlite, asbestos and cement:

|  | Percent |
| --- | --- |
| Kraft pulp | 24.8 |
| Perlite, T38 | 14.0 |
| Asbestos | 12.4 |
| Cement | 70.8 |

(All by Weight)

This product, when dewatered, resulted in a wet bulk thickness .396 inch; after slight pressure, .350", and still further pressure, .34". Another example, 10 samples were tested at a density of 39.79 pounds per cubic foot, and the average for all 10 samples was 788.59 pounds modulus of rupture. These samples were composed of the following:

|  | Grams |
| --- | --- |
| Cement | 320 |
| Asbestos | 55 |
| Perlite | 120 |
| Kraft fiber | 20 |

Another example designated test #1044, was comprised of 310 pounds of cement, 53 pounds of asbestos, 117 pounds of perlite, 20 pounds dry weight kraft. Water was added to the mixing tank to result in a consistency of 7.86% dry solids content. Pick up of the solids on the Oliver type forming machine was approximately 18/8". Samples of the pressed board from Run B-9 was pressed in the wet state on a hydraulic press at 375° F. through a pressure cycle of 40 pounds p.s.i. for 2 minutes; 400 p.s.i. for 2 minutes; pressure momentarily relieved, then brought to 1,200 p.s.i. for 10 minutes. The pressures were on an area equal to that of the ram and therefore represented unit pressures per square inch of sheet surface. The resulting sheet designated as B-2 had a density of 68.2 pounds per cubic foot and a thickness of .404 inch.

In the art of making sheet products by the so-called wet forming dewatering method, many attempts have been made to increase the strength of the product over its weight ratio. In each end product application of my sheet products as set forth herein, one must design into each, various characteristics to meet governmental code requirements, including water-proofing, architectural and sales appeal. Even those skilled in the art of fibrous products are sometimes at a loss to understand the full requirements of formation, particularly when cementitious materials of the hydraulic cement type are employed. To cement together, particularly the components utilized in the make-up of low and high density products of the sort set forth herein, becomes quite complex. In my co-pending cases, Serial No. 000,459, filed November 30, 1959, and Serial No. 351,949, filed April 29, 1953, of which this is a continuation-in-part, together with other prior disclosures now on record in the Patent Office, it may be seen how many factors are present that are anything but obvious, even to those considered to be skilled in the art.

For example, in the use of fiber as a reinforcement in the formation of my sheet and the characteristics of my resulting product, the type of fiber, and how it is treated, be it pre-treated or post-treated, or used in a crude unrefined state, may alter to some degree and determine whether or not it is suitable for a specified end use.

Glass roving with strands twisted into thread, for making reticulated mats, screen cloth, easily slipped on one another, unless treated, for altering the surface characteristics. The use of glass fiber and rods is quite a different problem than the use of organic threads that are twisted or woven into reticulated sheet form. Monofilament plastic strands, and some organic fibers, for example, fiber made from bamboo, straw, when unrefined, for use in my sheet products, do not provide the optimum non-slip characteristics most desirable for use in my cementitious product without further treatment by processing the surface and ends to roughen or otherwise provide a surface for holding firm the other components of the mixture.

When I sometimes use hydraulic cement in my sheet product to change the density and/or other characteristics, along with volcanic ash, perlite, pumice, and similar low-density volcanics, together with fiber, be they organic or inorganic, I find it extremely advantageous to treat the surface of the body of the fiber, including the cut ends, with an adhesive. The treatment thereof contributes much in adding strength and other wet forming advantages in making my sheet product. When I deposit discrete particles by impinging on the pre-treated fiber strand, there are many advantages in the formation of the product, and its ultimate dried strength. It appears that the particle size, shape and density has a substantial bearing on the dewatering cycle, apparently due to the particles spacing the fiber in the sheet matrix formed in the dewatering machine. The fluid is drawn and/or drained off during its consolidation into, first, the low-density form; then when pressed, and particularly when cement is employed as one of the components, there is a definite advantage in increasing the rate of dewatering and overall production of the product. The ultimate dried strength of the product is vastly improved as a result of the non-slip characteristics of the fiber component brought about by the particles being thoroughly anchored to the fiber and the cement, thereby preventing the otherwise slipping tendency of the fiber within the mass formed. This technique of depositing particles on the fiber strand makes available for practical end use applications of many fiber types that would otherwise be quite useless in contributing optimum strength in my sheet product. Densities as low as 17 lbs. per cubic foot are vastly increased in wet and dry strength even in that low-density range by the use of such a treatment of the fiber and sometimes the filler material. When waterproofing or water-repellants are employed as one of the additives, for example, wax, stearates, a combination of wax and stearate, asphalt, tar products, be they emulsion or dispersion form, together with solvents, it appears that the roughened surface of the fibers overcomes any of the disadvantages of slip within the mass that sometimes is present wherein excessive amounts of waterproofing is employed. In other words, the mechanical benefits brought about by the abrasive character of the fiber offsets the other disadvantages of untreated harsh fiber and when substantial amounts of waterproofing are required for some of the end applications.

For example, in one instance, by using 50% by weight of waste paper, and 50% by weight of fine mesh expanded perlite (from minus 30 mesh), depositing both while held under agitation in water, sometimes a total consistency as low as 1½% solids, then adding rosin size (about 3%) and then about 6% paper maker's alum, the slurry so formed is then dewatered over a 28 mesh wire screen, forming a low-density sheet, the dewatering cycle being about 26 seconds as formed on a 16" diameter dewatering machine. The usual practice in making a so-called soft board that is devoid of hydraulic cement is in keeping the perlite particle size much smaller than the fiber length employed so as to bind the perlite together with the fiber and not have separation by migration. This is necessary to provide complete intertwined felting properties in the product.

The above treatment provides a saleable product when pressed and dried, and presents a strong product when adequate pressure is employed as by the following example: in one case I provide waste organic fibrous materials and soak the fiber for several hours in water which is charged with calcium chloride, sometimes added while the fiber hydrates in the water. This is then beaten into a feltible fiber and dewatered as fed to a moving screen where it is again lifted off, sometimes dried, and brought into contact with a mechanical defibering means that sprays the fiber into the air, providing an adequate air suspension so one may then impinge dry, or a wet slurry, hydraulic cement particles onto the fiber from a separate source of supply, and thereby set firmly on the fiber a suitable quantity of cement for further use. In some cases, the cement is formed into a slurry and atomized and impinged upon the fibrous particle while held in suspension in the air. One example of the system employed is illustrated in U.S. Patents 2,125,860, Re-issue 20,119 and 2,447,161.

The following excerpt is from the supplier of amosite asbestos, as per quote: "Each type of fiber, be it organic or inorganic, presents certain forming problems and certain advantages in the end use application of the sheet product. In the cases of asbestos fiber, it too has its own distinctive properties and characteristics. In comparing amosite and chrysotile fiber, the following analysis shows the difference in chemical composition:

|  | Amosite | Chrysotile |
|---|---|---|
| Silica ($SiO_2$) | 50.24 | 39.05 |
| Alumina ($Al_2O_3$) |  | 3.67 |
| Ferric Oxide ($Fe_2O_3$) | 7.80 | 2.41 |
| Ferrous Oxide (FeO) | 32.00 |  |
| Magnesia (MgO) | 3.96 | 40.07 |
| Lime (CaO) |  |  |
| Sodium Oxide ($Na_2O$) | 2.12 |  |
| Combined Water ($H_2O$) | 3.00 | 14.48 |

"The predominant difference in physical characteristics between amosite and chrysotile asbestos is the fact that amosite has very high bulking characteristics. When processed under similar conditions, amosite may bulk to approximately 10 times the volume of the same weight of chrysotile asbestos fiber. This difference is largely accountable in the fact that amosite is a much longer, more resilient and harsher fiber than chrysotile, which tends to be soft and silky. Chrysotile fiber, because of its silky characteristic, is admirably suited for the manufacture of textile materials but has limited usage in the manufacture of insulating materials. Conversely, amosite has very little value as a textile fiber but is pre-eminent in the manufacture of insulation products.

"The long, resilient amosite fibers, with very low bulk density, make it possible to produce lightweight insulating materials of great mechanical strength and of an extremely high level of insulating efficiency.

"In insulating cements the bulk of amosite fiber contributes high covering capacity as well as high insulating efficiency.

"Amosite fiber can be used as an extender for chrysotile fiber in the manufacture of asbestos paper and millboard, the amosite giving these products high wet strength and making it possible to use lower grades of chrysotile fiber.

"In the manufacture of asbestos cement products, amosite has been used successfully up to about 10% to 15% of the total fiber, the longer fiber amosite in this case providing increased mechanical strength, both wet and dry, rapid release of water, and also enabling shorter grades of chrysotile to be used."

What is indicated above as advantages in the use of amosite has been confirmed in my use of the product. However, I have found that the use of expanded volcanics of the densities set forth contribute much more in forming products over that of merely asbestos and cement which is devoid of a low-density filler, be the asbestos component amosite or chrysotile or a combination of the two types of asbestos with just cement and no perlite or other like or similar filler.

The use of many of the fibers listed below in one manner or another may drastically change the characteristics of forming the end product values:

| | |
|---|---|
| Asplund | Unrefined |
| Asplund | Refined |
| Barked Oak | Refined |
| Barked Oak | Unrefined |
| Redwood | Refined |
| Redwood | Unrefined |
| Redwood bark | Refined |
| Redwood bark | Unrefined |

The organic feltable fibers are all useful in my process though most attention has been given to the use of Redwood fiber in combination with kraft pulp. In one example the following was employed. The kraft in refined feltable form contributes most in tensile and Mullen strength.

| | Percent |
|---|---|
| Kraft | 2.5 |
| Redwood | 2.5 |
| Cement | 62.0 |
| Chrysotile asbestos | 9.6 |
| Perlite | 23.4 |

Shingles made by this formula provided from 9.64 to 11.34% water after 24 hours soaking by being submerged at five inches of depth.

For example, in one instance 320 grams of cement, 55 grams of asbestos, 120 of perlite, and 20 grams of refined kraft, all weights being on the dry basis, were employed as a slurry, and diluted to 5 liters, with water.

This formula provided excellent fiber retention and other readily observable mat characteristics. The formula contained 310 lbs. of cement, 53 lbs. of asbestos, 117 lbs. of perlite, and 20 lbs., dry weight, refined kraft fiber. Water was added to the mixing tank to result in a consistency of 7.86% dry solid content for the run.

In this board run designated as B–9, no particular formation difficulties were encountered. A wet thickness, before pressing, was approximately 13/8 of an inch, after molding. The product was cured between layers of hardboard and waxed paper and allowed to set for one week. Small samples of the pressed and unpressed board, however, were taken for further pressing, and were pressed in the wet state on a hydraulic press at 375° F. through a pressure cycle of 40 lbs. p.s.i. for two minutes, 400 p.s.i. for two minutes, pressure momentarily relieved, and then brought to 1,200 p.s.i. for ten minutes. These pressures were on an area equal to that of the hydraulic press ram and therefore represent unit pressure per square inch of sheet surface. The resulting sheet, designated as D-2, had a density of 68.2 lbs. per cubic foot, and a thickness of .404 inch.

Another example, the sheets were pressed with a Southwark electrically heated hydraulic press, equipped with a 10″ ram, on 578 sq. inch platens. The platens were heated to 300° F. and a maximum of 1,500 p.s.i. was used. In one instance where I used the same formula with a wood plate with a striated design employed to impart a design on the sheet at a pressure of 927 p.s.i. It is to be pointed out that in the preparation of the organic type of pulp, using kraft as an example, or in fact even the perlitic filler material employed, that it is highly desirable to pre-soak these materials in water and very often the product characteristics are improved by putting into a digester. In this more or less cooking operation, it is useful to employ soda ash to break the sizing of the waste kraft stock. In one instance where kraft alone was employed, the digester was closed and steam admitted. Fifteen minutes were required to raise the temperature in the digester to 212° F. which was held for 60 minutes. At the end of this time, the free water was drained from the digester and the pulp discharged for further use. In any event, the preheating of the slurry component for forming my sheet product has several advantages, one being that it provides a more rapid drainage rate by lowering the surface tension during the dewatering cycle. Moreover, in certain instances it is advantageous to have the products in which the cement sometimes forms a part, to cause the cement to set more rapidly, and thereby increase the production capacity of the machine, and heat to the order of 212° F. to steam pressure, of providing 300° F., are advantages during cure of the product.

I have also discovered certain advantages in the employment of spheres assembled in a fashion to form a filter bed of the machine over which the product is dewatered. Because of then having merely point contact, I thereby provide a filter bed that will more readily drain off the water by natural drainage or forced drainage by vacuum and/or pressure.

A further advantage resides in providing different sized spheres made of glass or synthetic plastic wherein the spheres may more or less uniformly lie over a wire mesh or otherwise reticulated supporting means. In the instance of nylon spheres, for example, they may be bonded together at point contact with the use of solvents or compatible adhesives, providing thereby a strong filter bed base for creation of designs in the pressed product as well as providing an excellent drainage member.

In the use of perilitic particles in expanded form, it is not possible to have a true spherular form. In many cases, very little true spheres—depending upon how the discrete materials have expanded and the nature of the rock before expansion, determines how many small fragments in plate-like form are produced. The fragments are satisfactory in small quantity and become a part of my composition is most cases.

A uniform product is most desirable and, as stated, preferably I endeavor to obtain in the filler a semblance of a sphere, be it of an unexpanded form or one of multicellular structure. Drainage rate of the filler material is of great importance in increasing the rate at which the product may be made. In more recent employment of perlite, volcanic ash, and other such material in that general classification, I have found a definite advantage in coating, by spray application, or immersion, of the filler material in a solution of calcium chloride or its equivalent for the purpose of wetting the surface for application of cement in an atomized dry form. The use of calcium chloride is for the purpose of attaining greater adhesion of the cement to the particles by initially having much less water than normally required. If all of the cement is employed as it has been in the past as a highly dilute portion of the slurry, the bond to the particles is less and has less cementing value. The shorter period in which the cement is in contact with water, it appears for some not thoroughly understood reason, that much stronger products may be made by the so-called wet method of dewatering. It must be that a stronger paste is formed on the particles of perlite and when set by the contact with calcium chloride, or its equivalent, is less readily dislodged from the perlite when it is then added to a more dilute slurry together with the other components. Pretreatment of the organic fiber definitely prevents any deleterious effect in the setting of my product after dewatering, pressing, and curing under humid conditions. The employment of calcium chloride for treatment of either the filler material or the fiber is generally in the range of 2% to 4% calcium chloride, based upon the weight of the solid materials employed. Small proportions of glycolic acid, which is soluble in alcohol or water, appears to provide some beneficial characteristics to the completely cured product, though the action is not completely understood. The hardness of the product appears to be enhanced. The hardness of the product definitely increases in any event when cement is employed and properly cured, and compositions containing both 15% and 25% kraft fiber have been produced in $5/8''$ and $3/16''$ thicknesses. Oddly, in one instance, the high kraft fiber, in combination with a filler material and cement, produced a product of 29.5 lbs. per cubic foot and a modulus of rupture of 692 lbs., and a thickness of $5/8''$ thick. The low-kraft product of the same formula, $3/16''$ in thickness and a density of 39.5 lbs. per cubic foot, provided a modulus of rupture p.s.i. of 1,122 lbs. Again, a $3/16''$ pressed sheet with a kraft content of 25% but weighing only 30.7 lbs. per cubic foot, produced a modulus of rupture p.s.i. of 1,063, the modulus of rupture representing the point of rupture in bending.

Since many variations may be made from the illustrative details given, without departing from the scope of the invention, it is intended that the invention should be limited only by the terms of the claims interpreted as broadly as consistent with novelty over the prior art.

What is claimed is:

1. The method of forming and laying roofing, comprising the formation of pulp and cement on to a surface through and from which fluid is dewatered to form thereon a pliable felted sheet, conveying said sheet to a point on a roof while the sheet is pliable, unset and soft, and laying said sheet in place on said roof surface for set and cure.

2. The method of forming and laying roofing comprising the formation of pulp and cement on to a surface through and from which fluid passes under pressure, to form thereon a pliable felted sheet, conveying said sheet to a point on a surface while the sheet is pliable, unset and soft, and laying said sheet in place on said surface for set and cure.

3. A method of forming and applying a soft, pliable, unset protected covering which consists of simultaneously depositing on a porous carrier cement and fiber and dewatering the same by suction to form an unset cement and fiber sheet, conveying said carrier and sheet to a surface, and stripping the sheet from the carrier and depositing it in its unset pliable state for set and hardening on said surface.

4. Method of making and applying roof covering sheet and applying the same to a roof surface consisting of preparing a slurry of cement, fiber and filler, vacuum dewatering the slurry, pressing the dewatered mass to increase the density of said sheet to provide unset sheets, conveying the sheets and applying them in their denser form to a roof surface, and finally pressing and forming the unset sheets over uneven contours of the roof surface and over edge portions of like sheets previously applied to the roof surface.

5. A method of making covering sheet consisting of preparing a slurry of cement, feltable fiber and filler, dewatering the slurry, pressing the dewatered mass over a flexible fabric screen to increase the density of said sheet, conveying the sheets in their denser form on said screen to a surface, and again finally pressing and forming designs in the unset denser sheet.

6. A method of making a protective covering comprising treating fiber to make it water repellant, mixing said treated fiber with water and cement and dewatering said mixture.

7. A method of making and applying a protective covering comprising preparing a slurry of cement and fiber; said solids and said slurry comprised of 5% to 20% by weight of fiber and 80%–95% by weight of cement, dewatering said slurry over a porous surface, pressing said cement and fiber to remove a substantial amount of water to form a sheet of said mixture, and rolling said sheet into a roll on a core, said sheet being so conditioned as to be unrollable as a non-laminated sheet.

8. A method of making and applying a protective covering comprising preparing a slurry of cement and fiber; said solids and said slurry comprised of 5% to 20% by weight of fiber and 80% to 95% by weight of cement, dewatering said slurry over a porous surface, pressing said cement and fiber to remove a substantial amount of water to form a sheet of said mixture capable of being handled without fracture.

9. A method of making and applying a protective covering comprising preparing a slurry of cement and fiber; said solids and said slurry comprised of 5% to 20% by weight of fiber and 80% to 95% by weight of cement, dewatering said slurry over a porous sheet, pressing said cement and fiber to remove a substantial amount of water to form a sheet of said mixture on said porous sheet, and rolling said sheet into a roll.

10. A method according to claim 9 including the steps of unrolling said sheet and securing said sheet to a surface to be protected before said cement sets.

11. A method of making and applying protective covering sheets comprising preparing a slurry of cement and fiber, the amount of cement being between 80% and 95% by weight percent based on the amount of fiber, dewatering said slurry over a porous surface, pressing said cement and fiber to remove a substantial amount of water and to form sheets of said mixture, transporting said unset mixture of cement and fiber to a surface to be covered, and placing said sheets on said surface to be covered.

12. A method of making and applying protective covering sheets comprising preparing a slurry of cement, fiber and filler; said solids and said slurry comprised of 5% to 15% by weight of fiber, 5% to 30% by weight of low density filler and 55% to 90% by weight of cement, dewatering said slurry over a porous surface, pressing said solids to remove additional water and to form sheets thereof transporting said sheets before setting to the surface to be covered and securing said sheets to said surface.

13. A method of making a protective covering comprising pre-treating fiber and a low-density filler with resins, mixing said pre-treated fiber and low-density filler with water and then; adding the cement to the mixture, and dewatering said mixture, said dewatering being accelerated by the adding of the cement last to minimize the tendency of the cement to gelatinize.

14. A method of making a protective covering comprising pre-treating fiber with latex, mixing said pre-treated fiber with water and cement and dewatering said mixture.

15. A method of making a protective covering comprising pre-treating fiber and a low-density filler with latex, mixing said pre-treated fiber with water and cement and dewatering said mixture.

16. A method of preventing loss of gravel and shedding of the surface of old, in-place roofing, which comprises forming sheet material of wetted intertwined fiber and cement and laying said product in a wet state over rough surfacing material for set and cure.

17. A method of making and applying a protective covering comprising preparing a slurry of cement and feltible fiber, dewatering the slurry and felting the fiber with a cement to form a sheet, transporting said sheet to a surface to be protected, placing said sheet on said surface, and waterproofing said sheet while in place on said surface and while in an unset condition.

18. A method of making a protective covering comprising preparing a slurry of cement and feltible fiber, dewatering the slurry and felting the fiber with a cement to form a sheet, transporting said sheet to a surface, temporarily placing said sheet on said surface, and waterproofing said sheet while in place on surface and while in an unset condition and allowing to cure.

19. A method of making and applying a protective covering comprising preparing a slurry of cement and fibre, depositing cement and fibre on a porous carrier, dewatering the deposit to form a sheet of unset cement and fibre, transporting said sheet on said carrier to a surface to be protected, placing said sheet on said surface and removing said carrier from said sheet.

20. A method of making and applying a protective covering comprising preparing a slurry of cement and fiber, depositing said cement and fibre on a porous carrier, dewatering the deposit to form a sheet of unset cement and fibre, transporting said sheet on said carrier to a surface to be protected, placing said carrier and said sheet on said surface, removing said carrier from said sheet for reuse in the aforesaid process.

21. A method of fabricating a protective covering comprising the steps of forming a mixture of wet feltable fibers in unset cement, forming said mixture into a felted sheet, compressing said mixture to such density as substantially to prevent separation during handling, while retaining sufficient moisture to provide for setting and curing the cement, rolling said sheet while said cement is unset and substantially dewatered, thereby preventing adjacent layers from bonding together while rolled, unrolling said sheet, and allowing said sheet to set and cure.

22. A protective covering comprising wet unset inorganic cement containing fetlable fibrous material, said covering being in the form of a rolled sheet having a plurality of layers separable by unrolling said sheet, and a flexible porous fabric sheet carrier between adjacent rolled layers to provide support and to maintain the adjacent sheet layers separated during rolling and during unrolling, said flexible carrier being adapted for removal and reuse.

23. A protective covering as in claim 22, wherein said unset cement is disposed on and unattached to the convex and exteriorally directed surface of said flexible carrier.

24. A protective covering as in claim 22, wherein said unset cement is disposed on and unattached to the concave and interiorally directed surface of said flexible carrier.

25. A protective covering as in claim 22, wherein the rolled sheet of unset cement is mounted on a core.

26. A protective covering comprising a plurality of cement sheets composed of a mixture of unset substantially dry hydraulic inorganic cement, organic fiber, inorganic filler, pretreated waterproofed feltable fibers dispersed in said cement sheets, said sheets superimposed one upon the other and bonded together by pressure to provide a preformed protective covering, thereby providing improved adherence of said inorganic cement to the other parts of the mixture during hydration of the protective covering.

27. A method of making a protective covering, comprising pretreatment of organic fibers with dispersable resin by dispersing the fibers and resin in a fluid to bond the resin to the fibers, mixing said fibers with water and hydraulic cement, forming a sheet of said cement mixture, dewatering said sheet by application of a pressure up to 1200 p.s.i. to provide a sheet density of at least 20 pounds per cubic foot to provide improved resin dispersion and improved resistance to water absorption, and allowing said sheet to set and cure into a hardened stable covering.

28. A method as in claim 27, wherein said pretreatment includes waterproofing stearates to substantially waterproof the protective covering.

29. A method as in claim 27, wherein said pretreatment includes bitumin to substantially waterproof the protective covering.

30. A method of making a protective covering, comprising pretreatment of organic fibers with waterproofing agent particles to deposit particles of the water-proofing agent on respective fibers to roughen the fiber surfaces, mixing said fibers with water and hydraulic cement, forming a sheet of said cement mixture, dewatering said cement mixture sheet by application of pressure, said dewatering being accelerated by spaces effected about respective fibers by said waterproofing agent particles on said fibers, and then setting and curing said cement mixture sheet with improved strength and enhanced dimensional stability produced by said deposition of the waterproofing agent particles on said fibers to reduce slippage between said fibers and the surrounding matrix.

31. A method as in claim 30, wherein said waterproofing agent particles are mixed with low-density discrete particles of another material, and the mixed particles are deposited together upon said fibers.

32. A composition comprising a mixture of fibers coated with particles to roughen the surfaces of the fibers, and hydraulic cement.

33. A composition as in claim 32, said fibers being of the class consisting of glass, synthetic plastics, bamboo and straw, and said particles being of the class consisting of wax, stearates, asphalt, tar products and mixtures thereof.

References Cited by the Examiner

UNITED STATES PATENTS

| | | | |
|---|---|---|---|
| 942,660 | 12/1909 | Overbury | 206—59 |
| 1,721,861 | 7/1929 | Oden | 156—304 X |
| 1,805,739 | 5/1931 | Moeller et al. | 156—71 |
| 1,829,187 | 10/1931 | Piessevaux | 162—119 |
| 1,895,045 | 1/1933 | Moore | 156—230 |
| 1,994,262 | 3/1935 | Winding | 156—71 |
| 2,053,820 | 9/1936 | Fleischer | 161—48 |
| 2,280,579 | 4/1942 | Hardy | 161—406 X |
| 2,388,060 | 10/1945 | Hicks | 106—40 |
| 2,555,401 | 6/1951 | Fasold et al. | 162—155 |
| 2,585,515 | 2/1952 | Talboys | 161—48 |
| 2,667,107 | 1/1954 | Hesse | 162—154 X |
| 2,818,824 | 1/1958 | Read et al. | 162—154 X |
| 3,027,294 | 3/1962 | Bettoli et al. | 162—154 |
| 3,029,173 | 4/1962 | Reinhard | 161—48 |
| 3,058,872 | 10/1962 | Feigley et al. | 162—154 |
| 3,066,793 | 12/1962 | Fasold et al. | 206—59 |
| 3,113,670 | 12/1963 | Witting | 206—59 |
| 3,137,100 | 6/1964 | Harshberger | 50—193 |

FOREIGN PATENTS 587,556   4/1947   Great Britain.

EARL M. BERGERT, *Primary Examiner.*

HAROLD ANSHER, *Examiner.*